United States Patent
Huang et al.

(10) Patent No.: US 12,117,685 B2
(45) Date of Patent: Oct. 15, 2024

(54) DISPLAY PANEL AND ELECTRONIC DEVICE

(71) Applicant: HUIZHOU CHINA STAR OPTOELECTRONICS DISPLAY CO., LTD., Guangdong (CN)

(72) Inventors: Dongchen Huang, Guangdong (CN); Yinghui Wu, Guangdong (CN); Yuexia Lin, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/593,801

(22) PCT Filed: Jul. 13, 2021

(86) PCT No.: PCT/CN2021/105914
§ 371 (c)(1),
(2) Date: Sep. 24, 2021

(87) PCT Pub. No.: WO2022/262035
PCT Pub. Date: Dec. 22, 2022

(65) Prior Publication Data
US 2024/0019731 A1    Jan. 18, 2024

(30) Foreign Application Priority Data

Jun. 17, 2021    (CN) .......................... 202110670760.3

(51) Int. Cl.
*G02F 1/1335*    (2006.01)
*G02F 1/1334*    (2006.01)

(52) U.S. Cl.
CPC .... *G02F 1/133512* (2013.01); *G02F 1/13345* (2021.01); *G02F 1/133514* (2013.01)

(58) Field of Classification Search
CPC ..... H04M 1/0264; H04N 5/225; H04N 23/57; G02F 1/133512; G02F 1/133509;
(Continued)

(56) References Cited

U.S. PATENT DOCUMENTS

2017/0251137 A1    8/2017  Evans
2021/0072594 A1*   3/2021  Zhang ............... G02F 1/133603
(Continued)

FOREIGN PATENT DOCUMENTS

CN    102879946 A    1/2013
CN    107633822 A    1/2018
(Continued)

*Primary Examiner* — Jonathan Y Jung

(57) ABSTRACT

The present application provides a display panel and an electronic device. The display panel includes a panel body, a light control layer, first light source, and a light sensor. The panel body includes a plurality of openings positioned in a first display region and a second display region. The openings in the second display region are provided with a plurality of color resists. The openings in the first display region are hollowed. The light control layer includes an optical layer including a matte state and a transparent state. The light sensor is disposed under the optical layer. At least part of the light sensor corresponds to the hollowed openings.

20 Claims, 4 Drawing Sheets

(58) Field of Classification Search
CPC ......... G02F 1/133514; G02F 1/136222; H01L 29/78633; H01L 51/5284
See application file for complete search history.

(56) References Cited

U.S. PATENT DOCUMENTS

| | | | | |
|---|---|---|---|---|
| 2021/0088834 A1* | 3/2021 | Yu | .................. | G02F 1/133512 |
| 2021/0141266 A1* | 5/2021 | Takimoto | .......... | G02F 1/133512 |
| 2021/0181402 A1* | 6/2021 | Ota | .................. | G02B 6/0051 |
| 2021/0373374 A1* | 12/2021 | Li | .................. | G02F 1/136222 |

FOREIGN PATENT DOCUMENTS

| | | |
|---|---|---|
| CN | 208384291 U | 1/2019 |
| CN | 109379465 A | 2/2019 |
| CN | 109541849 A | 3/2019 |
| CN | 110286521 A | 9/2019 |
| CN | 110471211 A | 11/2019 |
| CN | 111221168 A | 6/2020 |
| CN | 112068356 A | 12/2020 |
| KR | 102087104 B1 | 4/2020 |

* cited by examiner

DISPLAY PANEL AND ELECTRONIC DEVICE

FIELD OF INVENTION

The present application is related to the field of display technology and specifically to a display panel and an electronic device.

BACKGROUND OF INVENTION

In order to increase a screen-to-body ratio, a through-hole or a blind-hole will be defined under a display panel to place a camera. However, a region where the display panel corresponding to the camera cannot display images, which is unfavorable for realizing a full-screen design.

SUMMARY OF INVENTION

The present application provides a display panel and an electronic device, which are conducive to realizing a full-screen design.

The present application provides a display panel. The display panel includes a panel body, a light control layer, a first light source, and a light sensor. The panel body includes a first display region, a second display region, and a non-display region. The first display region is positioned at a periphery of the second display region and is connected to the non-display region. The panel body further includes a color filter layer. The color filter layer includes a black matrix and a plurality of color resists. The black matrix is provided with a plurality of openings. The openings are positioned in the first display region and the second display region. The openings in the second display region are provided with the color resists. The openings in the first display region are hollowed. The light control layer includes an optical layer corresponding to the first display region. The optical layer includes a matte state and a transparent state. The first light source is disposed on a side of the light control layer away from the second display region. The light sensor is disposed under the optical layer. At least part of the light sensor corresponds to the hollowed openings.

Optionally, in an embodiment of the present application, the light control layer further includes a first electrode and a second electrode. The optical layer is disposed between the first electrode and the second electrode.

Optionally, in an embodiment of the present application, the optical layer further includes polymer network liquid crystals or polymer dispersed liquid crystals.

Optionally, in an embodiment of the present application, the display panel further includes a backlight module disposed under the panel body. The backlight module includes a first backlight portion corresponding to the first display region. The first backlight portion includes the light control layer and the first light source.

Optionally, in an embodiment of the present application, the panel body further includes a plurality of first subpixels and a plurality of second subpixels. The first subpixels are positioned in the first display region. The second subpixels are positioned in the second display region. The first subpixels include a first liquid crystal layer.

Optionally, in an embodiment of the present application, the first light source includes first sub-light sources, second sub-light sources, and third sub-light sources. Light colors of the first sub-light sources, the second sub-light sources, and the third sub-light sources are different.

Optionally, in an embodiment of the present application, an arrangement of the first sub-light sources, the second sub-light sources, and the third sub-light sources in a first direction is same as an arrangement of the second subpixels away from the first display region in the first direction. The first direction is parallel to an extending direction of the side of the light control layer away from the second display region.

Optionally, in an embodiment of the present application, the first subpixels and the second subpixels further include a first substrate and a second substrate. The second substrate is disposed on the first substrate. The second subpixels include a second liquid crystal layer. The first liquid crystal layer and the second liquid crystal layer are disposed between the first substrate and the second substrate. The second liquid crystal layer is positioned in the second display region. The second substrate includes the color filter layer.

Optionally, in an embodiment of the present application, a first light-shielding portion is disposed between the first substrate and the second substrate at a junction of the first display region and the second display region.

Optionally, in an embodiment of the present application, the backlight module further includes a second backlight portion corresponding to the second display region. A second light-shielding portion is disposed between the first backlight portion and the second backlight portion.

Optionally, in an embodiment of the present application, the second light-shielding portion includes a first sub-light-shielding portion and a second sub-light-shielding portion. The first sub-light-shielding portion is disposed on a side of the light control layer adjacent to the second backlight portion. The second sub-light-shielding portion is disposed on a side of the first sub-light-shielding portion away from the panel body and corresponds to the first sub-light-shielding portion.

Optionally, in an embodiment of the present application, the first light source includes organic light-emitting diodes, mini light-emitting diodes, or micro light-emitting diodes.

Optionally, in an embodiment of the present application, the light sensor includes a camera or a fingerprint sensor.

The present application further provides an electronic device including any one of the above display panels.

In the display panel and the electronic device provided by the present application, the display panel includes the panel body, the light control layer, the first light source, and the light sensor. The panel body includes the first display region, the second display region, and the non-display region. The first display region is positioned at the periphery of the second display region and is connected to the non-display region. The panel body further includes the color filter layer. The color filter layer includes the black matrix and the color resists. The black matrix is provided with the openings. The openings are positioned in the first display region and the second display region. The openings in the second display region are provided with the color resists. The openings in the first display region are hollowed. The light control layer includes the optical layer corresponding to the first display region. The optical layer includes the matte state and the transparent state. The first light source is disposed on the side of the light control layer away from the second display region. The light sensor is disposed under the optical layer. At least part of the light sensor corresponds to the hollowed openings. Through disposing the light control layer and supplying a backlight for the first display region of the panel body by configuring the optical layer to scatter light of the first light source, the display panel realizes a display function in the first display region. When the first display region does not display images, the optical layer allows incident light passing through the panel body to transmit, so the incident light can be received by the light sensor, thereby realizing a sensing function in the first display region. This is beneficial to realize a full-screen display design of the display panel.

DETAILED DESCRIPTION OF EMBODIMENTS

In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 1A:
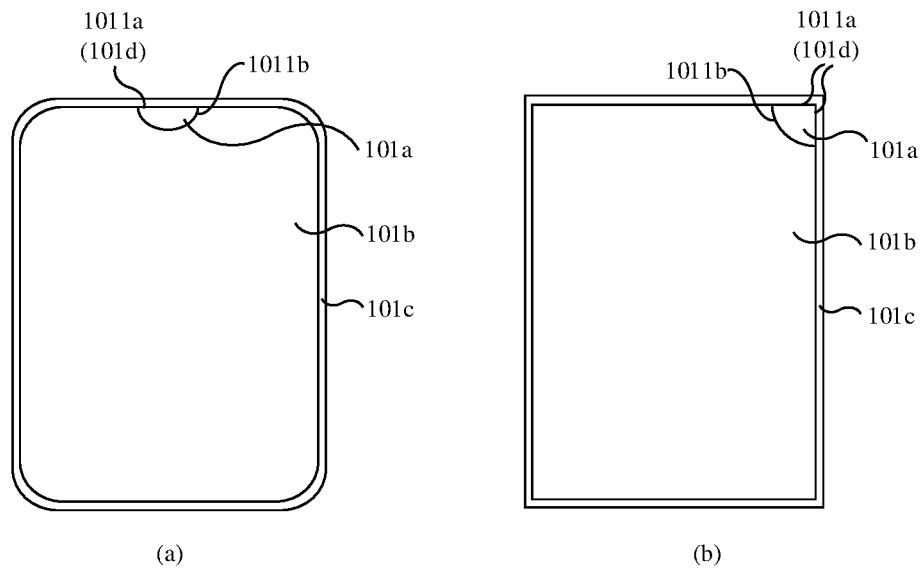
FIGS. 1A-1B are structural schematic diagrams of a display panel provided by an embodiment of the present application.
Figure 1B:
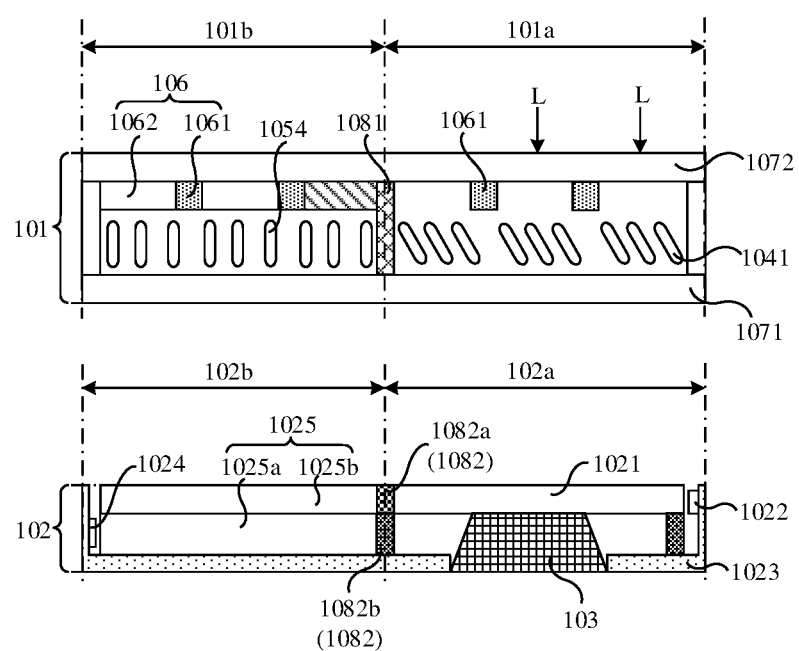
Figure 1C:
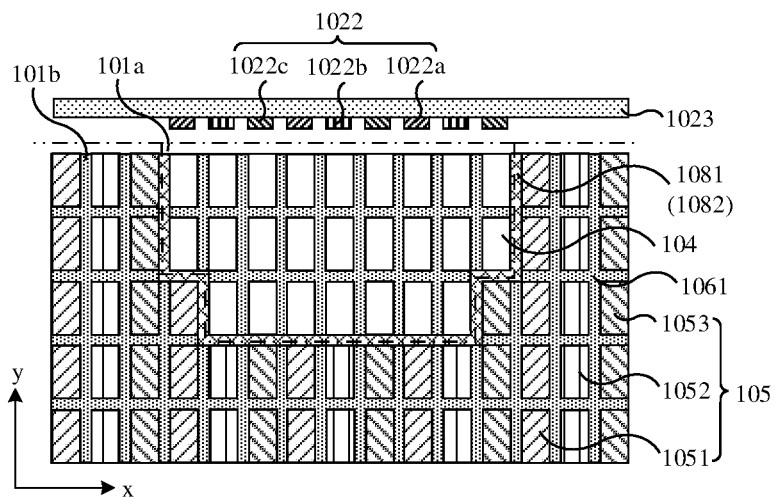
FIGS. 1C-1D are schematic diagrams of arrangements of first subpixels and second subpixels provided by embodiments of the present application.
Figure 1D:
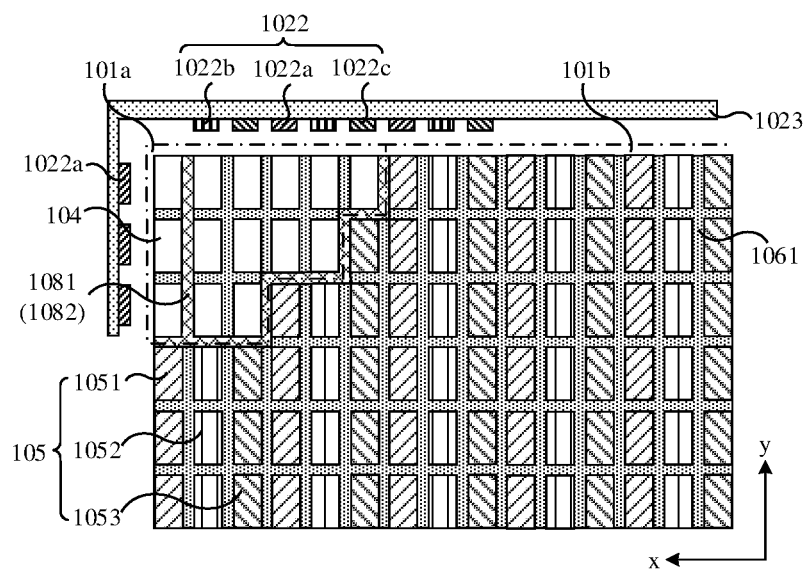

Specifically, FIGS. 1A-1B are structural schematic diagrams of a display panel provided by an embodiment of the present application, and FIGS. 1C-1D are schematic diagrams of arrangements of first subpixels and second subpixels provided by embodiments of the present application. Referring to FIGS. 1A-1B, the present application provides the display panel, and the display panel includes a panel body 101, a backlight module 102, and a light sensor 103.

The panel body 101 includes a first display region 101*a*, a second display region 101*b*, and a non-display region 101*c*. The first display region 101*a* and the second display region 101*b* are connected to the non-display region 101*c*. Specifically, the first display region 101*a* is positioned at a periphery of the second display region 101*b* and is connected to the non-display region 101*c*.

Optionally, a number of the first display region 101*a* of the display panel is not limited to one. Optionally, in a top view, a shape of the first display region 101*a* is not limited to shapes such as a semicircle, a sector, a rectangle, and a polygon. The first display region 101*a* and the non-display region 101*c* can have at least one junction 101*d*.

Specifically, referring to FIG. 1A-(a), in the top view, the first display region 101*a* is semicircular. The first display region 101*a* has a first side 1011*a* and a second side 1011*b*. The second side 1011*b* is connected to the second display region 101*b*. The first side 1011*a* is connected to the non-display region 101*c*, so that the first display region 101*a* and the non-display region 101*c* have one junction 101*d*.

Specifically, referring to FIG. 1A-(b), in the top view, the first display region 101*a* is sector-shaped. The first display region 101*a* has two first sides 1011*a* and a second side 1011*b*. The two first sides 1011*a* are respectively connected to two ends of the second side 1011*b*. The second side 1011*b* is connected to the second display region 101*b*. The two first sides 1011*a* are connected to the non-display region 101*c*, so that the first display region 101*a* and the non-display region 101*c* have two junctions 101*d*.

Referring to FIGS. 1A-1D, the panel body 101 further includes a plurality of first subpixels 104 and a plurality of second subpixels 105. The first subpixels 104 are positioned in the first display region 101*a*. The second subpixels 105 are positioned in the second display region 101*b*.

Furthermore, the first subpixels 104 and the second subpixels 105 includes a color filter layer 106. The color filter layer 106 includes a black matrix 1061 and a plurality of color resists 1062. The black matrix 1061 is provided with a plurality of openings. The openings are positioned in the first display region 101*a* and the second display region 101*b*. The openings in the second display region 101*b* are provided with the color resists 1062. The openings in the first display region 101*a* are hollowed. In other words, the color resists 1062 are only positioned in the second display region 101*b* but not in the first display region 101*a*.

Referring to FIG. 1B, the backlight module 102 is disposed under the panel body 101. The backlight module 102 includes a first backlight portion 102*a* corresponding to the first display region 101*a*. The first backlight portion 102*a* includes a light control layer 1021 and a first light source 1022. The light control layer 1021 includes an optical layer corresponding to the first display region 101*a*. The optical layer includes a matte state and a transparent state. The first light source 1022 is disposed on a side of the light control layer 1021 away from the second display region 101*b*.

The light sensor 103 is disposed under the light control layer 1021. Specifically, the backlight module 102 further includes a backplate 1023. The light control layer 1021 is disposed on the backplate 1023. The first light source 1022 is disposed on a side wall of the backplate 1023. The first light source 1022 directly faces an end of the light control layer 1021 away from the second display region 101*b*. The backplate 1023 includes a through-hole corresponding to the first display region 101*a*. The light sensor 103 directly faces the through-hole, so that the light sensor 103 is disposed under the optical layer.

Furthermore, in order to enable incident light L passing through the panel body 101 to be effectively received by the light sensor 103, at least part of the light sensor 103 corresponds to the hollowed openings.

Optionally, the light sensor 103 includes a camera, a fingerprint sensor, and the like. Optionally, an outer surface of the light sensor 103 is further provided with a reflective layer. A transparent support layer is further provided between the light sensor 103 and the light control layer 1021. The transparent support layer is configured to support the light control layer 1021. Furthermore, the transparent support layer is glass.

The optical layer includes the matte state and the transparent state. Therefore, the light control layer 1021 in cooperation with the first light source 1022 can realize a display function of the display panel in the first display region 101*a*. Moreover, by allowing the incident light L passing through the panel body 101 to be received by the light sensor 103, a sensing function of the light sensor 103 can be realized.

Specifically, when the optical layer is in the matte state, the first light source 1022 emits light. The optical layer includes a scattering structure to scatter light toward the first light source 1022 of the first display region 101*a*, so as to provide a backlight for the first display region 101*a* through the first light source 1022 and the optical layer. When the optical layer is in the transparent state, the first light source 1022 does not emit light. The optical layer is configured to transmit the incident light L passing through the first display region 101*a* of the panel body 101, so that the incident light L can received by the light sensor 103 to realize the sensing function of the light sensor 103.

The present application disposes the light control layer 1021 in the display panel, so that the light control layer 1021 cooperates with the panel body 101 and the first light source 1022 to realizing the display function and the sensing function in the first display region 101*a* of the display panel, which is conducive to realize a full-screen design of the display panel. In addition, by disposing the light control layer 1021 in the display panel, the light control layer 1021 cooperates with the panel body 101 and the first light source 1022 to realizes a condition that the light sensor 103 does not realize the sensing function when the first display region 101*a* realizes display function, and a condition that the light sensor 103 realizes the sensing function when the first display region 101*a* realizes display function. When the display panel realizes the display function and the sensing function in a same region, the sensing function and the display function is prevented from occurring a problem of mutual influence.

Please continue to refer to FIGS. 1A-1B. The light control layer 1021 further includes a first electrode and a second electrode. The optical layer is disposed between the first electrode and the second electrode. The optical layer includes polymer network liquid crystals or polymer dispersed liquid crystals.

Furthermore, the optical layer includes the polymer network liquid crystals. When a percentage content of photopolymerizable monomers in the light control layer 1021 ranges from 10% to 20%, if there is no electric field between the first electrode and the second electrode, the liquid crystals exist in a form of a multi-domain state in a network, so a director distribution of each liquid crystal domain is random, resulting in that the incident light will be scattered at interfaces between domains due to a discontinuous change of a refractive index, and the optical layer appears opaque; and if there is an electric field between the first electrode and the second electrode, the electric field causes a directors in all liquid crystal domains to be arranged in a single domain state along a direction of the electric field, which forms a medium having a uniform refractive index for the incident light L, and the optical layer appears transparent. When a vertical transmittance reaches the maximum, the optical layer is in the transparent state. The vertical transmittance can be maximized by controlling a voltage applied to the first electrode and the second electrode.

When the percentage content of the photopolymerizable monomers in the light control layer 1021 is less than 10%, a condition of the light control layer 1021 is opposite to a condition when the percentage content of the photopolymerizable monomers in the light control layer 1021 ranges from 10% to 20%. This means that when the percentage content of the photopolymerizable monomers in the light control layer 1021 is less than 10%, if there is no electric field between the first electrode and the second electrode, the optical layer is in the transparent state; and if there is an electric field exists between the first electrode and the second electrode, the optical layer is in the matte state.

Further, the optical layer includes polymer dispersed liquid crystals. If there is no electric field between the first electrode and the second electrode, the optical layer is in the matte state. If there is an electric field between the first electrode and the second electrode, the optical layer is in the transparent state.

Please continue to refer to FIGS. 1A-1D. The first subpixels 104 include a first liquid crystal layer 1041. Optionally, the first liquid crystal layer 1041 includes positive liquid crystals or negative liquid crystals.

When the color resists 1062 are only positioned in the second display region 101*b* but not in the first display region 101*a*, in order to realize a full-color display of the first display region 101*a*, the first light source 1022 includes a plurality of sub-light sources with different luminous colors. Specifically, the first light source 1022 includes first sub-light sources 1022*a*, second sub-light sources 1022*b*, and third sub-light sources 1022*c* with different luminous colors. Optionally, the first sub-light sources 1022*a*, the second sub-light sources 1022*b*, and the third sub-light sources 1022*c* include red, green, blue, yellow, white, etc. Optionally, the first light source 1022 further includes fourth sub-light sources, fifth sub-light sources, etc., which have luminous colors different from the luminous colors of the first sub-light sources 1022*a*, the second sub-light sources 1022*b*, and the third sub-light sources 1022*c*, which is not repeatedly described herein.

Furthermore, in order to reduce a display difference between the first display region 101*a* and the second display region 101*b*, the first subpixels 104 and the second subpixels 105 have a same arrangement. Specifically, an arrangement of the first sub-light sources 1022*a*, the second sub-light sources 1022*b*, and the third sub-light sources 1022*c* in a first direction x is same as an arrangement of the second subpixels 105 away from the first display region 101*a* in the first direction x. The first direction x is parallel to an extending direction of the side of the light control layer 1021 away from the second display region 101*b*.

Specifically, the arrangement of the second subpixels 105 in the second display region 101*b* in a form of standard RGB is taken as an example. Red subpixels 1051 whose luminous color are red in the second subpixels 105 are arranged along a second direction y. Green subpixels 1052 whose luminous color are green in the second subpixels 105 are arranged along the second direction y. Blue subpixels 1053 whose luminous color are blue in the second subpixels 105 are arranged along the second direction y. The red subpixels 1051, the green subpixels 1052, and the blue subpixels 1053 are sequentially arranged along the first direction x. If a luminous color of the first sub-light sources 1022*a* is red, a luminous color of the second sub-light sources 1022*b* is green, and a luminous color of the third sub-light sources 1022*c* is blue, then the arrangement of the first sub-light sources 1022*a*, the second sub-light sources 1022*b*, and the third sub-light sources 1022*c* in the first direction x is same as an arrangement of the red subpixels 1051, the green subpixels 1052, and the blue subpixels 1053 in the first direction x in the second display region 101*b*. In other words, in a top view, as shown in FIG. 10, the first sub-light sources 1022*a* correspond to columns where the red subpixels 1051 are positioned, the second sub-light sources 1022*b* correspond to columns where the green subpixels 1052 are positioned, and the third sub-light sources 1022*c* correspond to columns where the blue subpixels 1053 are positioned.

Optionally, when the first display region 101*a* and the non-display region 101*c* have two junctions 101*d*, the first light source 1022 can be arranged along the first direction x, and the arrangement of the first sub-light sources 1022*a*, the second sub-light sources 1022*b*, and the third sub-light sources 1022c in the first direction x is same as the arrangement of the second subpixels 105 away from the first display region 101a in the first direction x; or the first light source 1022 is arranged along the second direction y, and the arrangement of the first sub-light sources 1022a, the second sub-light sources 1022b, and the third sub-light sources 1022c in the second direction y is same as an arrangement of the second subpixels 105 away from the first display region 101a in the second direction y; or part of the first light source in the first light source 1022 is arranged along the first direction x, a rest of the first light source is arranged along the second direction y, the luminous colors of the first light source 1022 arranged along the second direction y are same, and an arrangement of the first light source 1022 along the first direction x is same as the arrangement of the second subpixels 105 away from the first display region 101a in the first direction x. In other words, as shown in FIG. 1D, the first sub-light sources 1022a emitting red light are arranged along the second direction y, and an arrangement of the second sub-light sources 1022b emitting green light, the third sub-light sources 1022c emitting blue light, and the first sub-light sources 1022a in the first direction x is same as the arrangement of the red subpixels 1051, the green subpixels 1052, and the blue subpixels 1053 in the first direction x in the second display region 101b.

Figure 2:
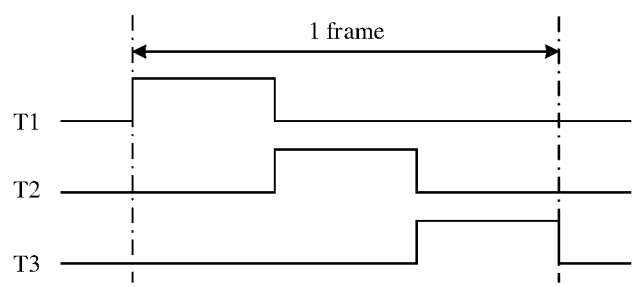
FIG. 2 is a control timing diagram of a first light source provided by an embodiment of the present application.

Optionally, the display panel can realize a light emission control of the first light source 1022 through a control timing diagram of the first light source as shown in FIG. 2. When a refresh rate of the display panel is greater than or equal to 60 Hz, within a duration of one frame, the first sub-light sources 1022a emitting red light respond to the first control signal T1 to emit light, and then the second sub-light sources 1022b emitting green light respond to the second control signal T2 to emit light, and finally the third sub-light sources 1022c emitting blue light response to the third control signal T3 to emit light. Through a control of the first control signal T1, the second control signal T2, and the third control signal T3 at different times that enables the first light source 1022 to emit light and an effect of persistence of vision, the display function of the first display region 101a is realized.

It can be understood that a light-emitting control method of the first light source 1022 can also be configured according to specific needs, which is not repeatedly described herein.

Optionally, the second display region 101b of the display panel may be a self-luminous display region or a passive-luminous display region. Specifically, the second display region 101b of the display panel is a self-luminous display region, and the second subpixels 105 positioned in the second display region 101b are light-emitting diodes. Optionally, the light-emitting diodes include organic light-emitting diodes, mini light-emitting diodes, or micro light-emitting diodes.

Specifically, please continue to refer to FIGS. 1A-1D, the second display region 101b of the display panel is a passive-luminous display region. The backlight module 102 further includes a second backlight portion 102b. The second backlight portion 102b corresponds to the second display region 101b. The second backlight portion 102b includes a second light source 1024 and a backlight film 1025.

Optionally, the second light source 1024 is a direct light source. The direct light source is disposed on the backplate 1023 and corresponds to the second display region 101b. The backlight film 1025 is disposed between the second light source 1024 and the panel body 101. The backlight film 1025 includes a diffuser, a brightness enhancement film, etc.

Optionally, the second light source 1024 is an edge light source. The backlight film 1025 includes a light guide plate 1025a, a brightness enhancement film 1025b, etc. The brightness enhancement film 1025b is disposed on the light guide plate 1025a. The edge light source is disposed on the side wall of the backplate 1023 and directly faces an end of the light guide plate 1025a away from the first backlight portion 102a.

Optionally, the first light source 1022, the second light source 1024 can be organic light-emitting diodes, mini light-emitting diodes, or micro light-emitting diodes.

Optionally, the backlight film 1025 and the light control layer 1021 are fixedly connected by an adhesive. The backlight film 1025 is configured to support the light control layer 1021, so that the light control layer 1021 is disposed on the backplate 1023. Optionally, the backlight film 1025 includes a first film material and a second film material, which are laminated. The first film material is disposed on a side of the second film material adjacent to the backplate 1023. On a side adjacent to the first backlight portion 102a, a boundary of the first film material is outside a boundary of the second film material, so that part of the light control layer 1021 is disposed on the first film material, thereby realizing a support of the light control layer 1021.

Please continue to refer to FIG. 1B. The first subpixels 104 and the second subpixels 105 further include a first substrate 1071 and a second substrate 1072. The second substrate 1072 is disposed on the first substrate 1071. The second subpixels 105 include a second liquid crystal layer 1054. The second liquid crystal layer 1054 is positioned in the second display region 101b. The first liquid crystal layer 1041 and the second liquid crystal layer 1054 are both disposed between the first substrate 1071 and the second substrate 1072. Optionally, the first liquid crystal layer 1041 and the second liquid crystal layer 1054 are in a same layer. Optionally, the second liquid crystal layer 1054 includes positive liquid crystals or negative liquid crystals.

Optionally, the second substrate 1072 includes the color filter layer 106.

Please continue to refer to FIGS. 1A-1D. In order to prevent the first display region 101a and the second display region 101b from occurring a display interference, the display panel further includes a first light-shielding portion 1081. The first light-shielding portion 1081 is disposed between the first substrate 1071 and the second substrate 1072 and is disposed at a junction of the first display region 101a and the second display region 101b. Optionally, the first light-shielding portion 1081 includes a black photoresist.

Furthermore, the display panel further includes a second light-shielding portion 1082. The second light-shielding portion 1082 is disposed between the first backlight portion 102a and the second backlight portion 102b. Optionally, the second light-shielding portion 1082 includes a first sub-light-shielding portion 1082a and a second sub-light-shielding portion 1082b. The first sub-light-shielding portion 1082a is disposed on a side of the light control layer 1021 adjacent to the second backlight portion 102b. The second sub-light-shielding portion 1082b is disposed on the backplate 1023 and corresponds to the first sub-light-shielding portion 1082a. In a top view, the second light-shielding portion 1082 coincides with the first light-shielding portion 1081. Optionally, the first sub-light-shielding portion 1082a is a black ink to block light emitted by the second light source 1024 from entering the light control layer 1021. The second sub-light-shielding portion 1082b is a black ink or black tape to block the light emitted by the first light source 1022 and the second light source 1024 from entering the light sensor 103.

Optionally, the display panel further includes an alignment layer, a polarizer, pixel electrodes, a common electrode, a touch electrode, and other parts not shown.

Figure 3:
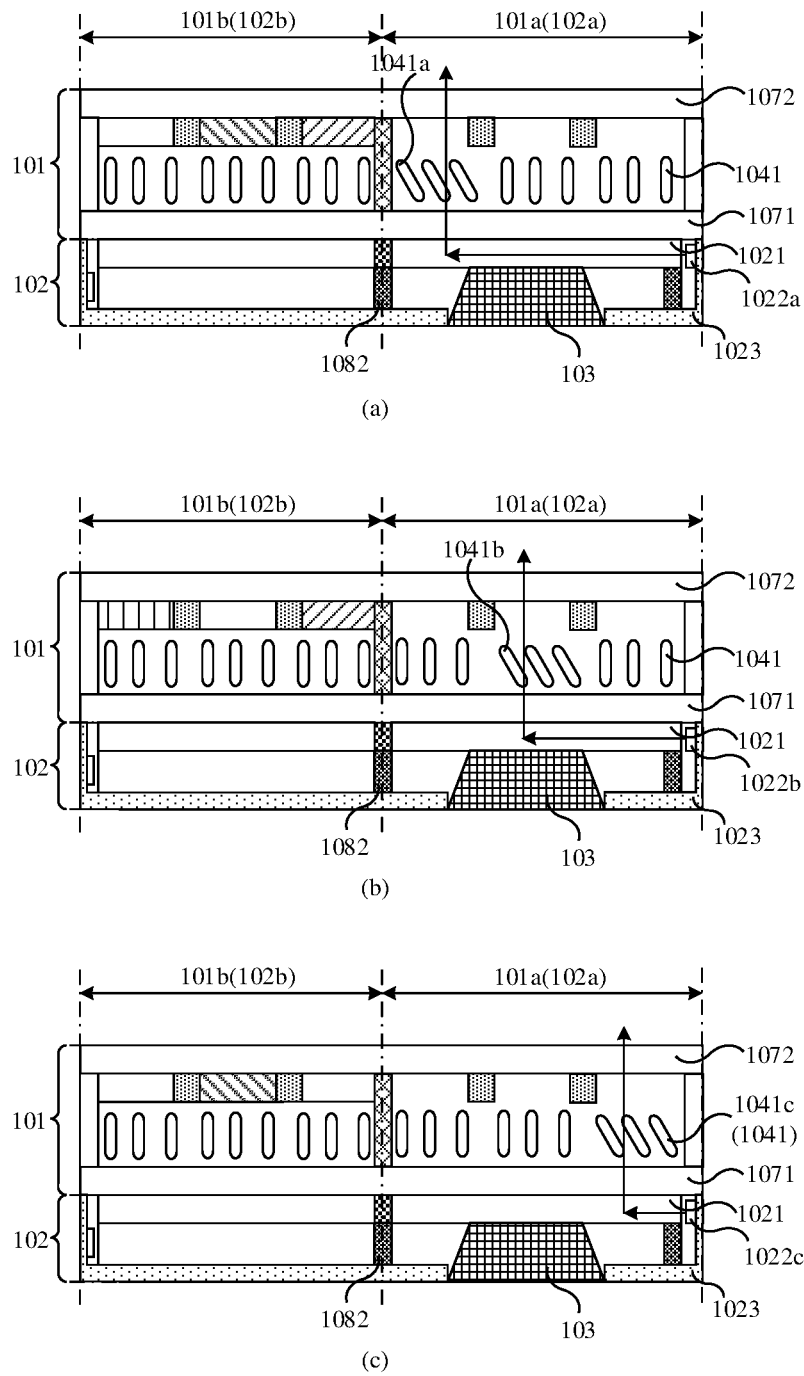
FIG. 3 is a structural schematic diagram of a first display region provided by an embodiment of the present application in a display state.
Figure 4:
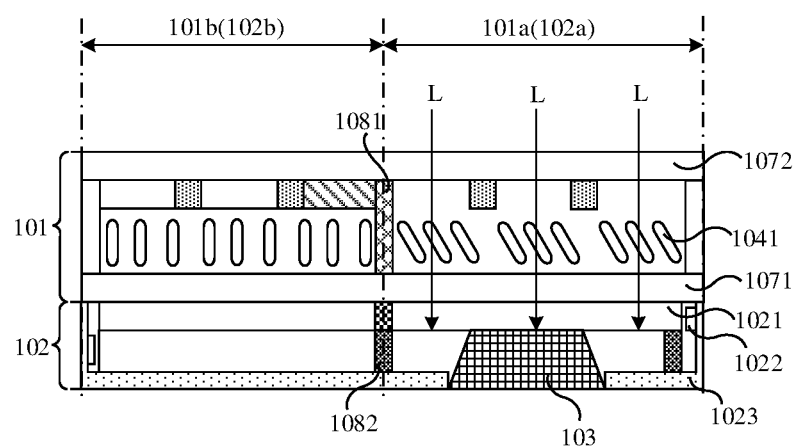
FIG. 4 is a structural schematic diagram of the first display region provided by an embodiment of the present application in a sensing state.

FIG. 3 is a structural schematic diagram of the first display region provided by an embodiment of the present application in a display state. FIG. 4 is a structural schematic diagram of the first display region provided by an embodiment of the present application in a sensing state. Taking the optical layer including the polymer network liquid crystals, the percentage content of the photopolymerizable monomers in the light control layer 203 ranging from 10% to 20%, and the first subpixels 104 including first color subpixels corresponding to the first sub-light sources 1022a, second color subpixels corresponding to the second sub-light sources 1022b, and third color subpixels corresponding to the third sub-light sources 1022c as an example and with reference to the control timing diagram shown in FIG. 2 to describe a working principle of the first display region 101a.

Please continue to refer to FIGS. 2 and 3. When the first display region 101a is in the display state, there is no electric field between the first electrode and the second electrode of the light control layer 1021, and the optical layer is in the matte state. The optical layer includes a scattering structure.

In one frame, when the first control signal T1 is valid, the second control signal T2 and the third control signal T3 are invalid, the first sub-light sources 1022a are turned on under a control of the first control signal T1, and light emitted by the first sub-light sources 1022a is scattered by the light control layer 1021. At a same time, there are driving voltage difference between the pixel electrodes corresponding to the first color subpixels in the first display region 101a and the common electrode, so that liquid crystals 1041a in the first liquid crystal layer 1041 are defected under an action of the driving voltage difference. Therefore, the light of the first sub-light sources 1022a scattered by the light control layer 1021 can pass through, and the first color subpixels realize the display function, as shown in of FIG. 3-(a). After then, when the second control signal T2 is valid, the first control signal T1 and the third control signal T3 are invalid, the second sub-light sources 1022b are turned on under a control of the second control signal T2, and light emitted by the second sub-light sources 1022b is scattered by the light control layer 1021. At a same time, there are driving voltage difference between the pixel electrodes corresponding to the second color subpixels in the first display region 101a and the common electrode, so that liquid crystals 1041b in the first liquid crystal layer 1041 are defected under an action of the driving voltage difference. Therefore, the light of the second sub-light sources 1022b scattered by the light control layer 1021 can pass through, and the second color subpixels realize the display function, as shown in of FIG. 3-(b). Finally, when the third control signal T3 is valid, the first control signal T1 and the second control signal T2 are invalid, the third sub-light sources 1022c are turned on under a control of the third control signal T3, and light emitted by the third sub-light sources 1022c is scattered by the light control layer 1021. At a same time, there are driving voltage difference between the pixel electrodes corresponding to the third color subpixels in the first display region 101a and the common electrode, so that liquid crystals 1041c in the first liquid crystal layer 1041 are defected under an action of the driving voltage difference. Therefore, the light of the third sub-light sources 1022c scattered by the light control layer 1021 can pass through, and the third color subpixels realize the display function, as shown in of FIG. 3-(c).

Please continue to refer to FIGS. 2 and 4. When the first display region 101a is in the display state, there is an electric field between the first electrode and the second electrode of the light control layer 1021, and the optical layer is in the transparent state. At a same time, the first light source 1022 is in an off state, and there is a driving voltage difference between the pixel electrodes and the common electrode corresponding to the second subpixels 105 in the first display region 101a, so that the liquid crystals in the first liquid crystal layer 1041 are defected under an action of the driving voltage difference. The incident light L passes through the panel body 101 and the light control layer 1021 and enters the light sensor 103 to realize the sensing function of the display panel.

An embodiment of the present application further provides an electronic device. The electronic device includes any of the above display panels.

Optionally, the electronic device includes fixed terminals (e.g., TVs, desktop computers, etc.), mobile terminals (e.g., mobile phones, notebook computers, etc.), wearable devices (e.g., bracelets, VR virtual display devices, and AR enhanced display devices), measuring equipment (e.g., thermometers, etc.), etc.

Embodiments of the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. A display panel, comprising:
    a panel body having a first display region, a second display region, and a non-display region, wherein the first display region is positioned at a edge of the second display region and is connected to the non-display region, the panel body comprises a color filter layer, the color filter layer comprises a black matrix and a plurality of color resists, the black matrix is provided with a plurality of holes, each of second ones of the holes in the second display region is filled with one of the color resists, and each of first ones of the holes in the first display region is empty;
    a light control layer and a first light source, wherein the light control layer comprises an optical layer corresponding to the first display region, the optical layer has one of a matte state and a transparent state, and the first light source is disposed on a side of the light control layer away from the second display region; and
    a light sensor disposed under the optical layer, wherein at least part of the light sensor is opposite to one of the first ones of the holes.

2. The display panel according to claim 1, wherein the light control layer further comprises a first electrode and a second electrode, and the optical layer is disposed between the first electrode and the second electrode.

3. The display panel according to claim 2, wherein the optical layer comprises polymer network liquid crystals or polymer dispersed liquid crystals.

4. The display panel according to claim 1, further comprising a backlight module disposed under the panel body, wherein the backlight module comprises a first backlight portion corresponding to the first display region, and the first backlight portion comprises the light control layer and the first light source.

5. The display panel according to claim 4, wherein the panel body further comprises a plurality of first subpixels and a plurality of second subpixels, the first subpixels are positioned in the first display region, the second subpixels are positioned in the second display region, and the first subpixels comprise a first liquid crystal layer.

6. The display panel according to claim 5, wherein the first light source comprises first sub-light sources, second sub-light sources, and third sub-light sources, and light colors of the first sub-light sources, the second sub-light sources, and the third sub-light sources are different.

7. The display panel according to claim 6, wherein an arrangement of the first sub-light sources, the second sub-light sources, and the third sub-light sources in a first direction is same as an arrangement of the second subpixels away from the first display region in the first direction, and the first direction is parallel to an extending direction of the side of the light control layer away from the second display region.

8. The display panel according to claim 7, wherein the first subpixels and the second subpixels further comprise a first substrate and a second substrate, the second substrate is disposed on the first substrate, the second subpixels comprise a second liquid crystal layer, the first liquid crystal layer and the second liquid crystal layer are disposed between the first substrate and the second substrate, the second liquid crystal layer is positioned in the second display region, and the second substrate comprises the color filter layer.

9. The display panel according to claim 8, wherein a first light-shielding portion is disposed between the first substrate and the second substrate at a boundary between the first display region and the second display region.

10. The display panel according to claim 8, wherein the backlight module further comprises a second backlight portion corresponding to the second display region, and a second light-shielding portion is disposed between the first backlight portion and the second backlight portion.

11. The display panel according to claim 10, wherein the second light-shielding portion comprises a first sub-light-shielding portion and a second sub-light-shielding portion, the first sub-light-shielding portion is disposed on a side of the light control layer close to the second backlight portion, and the second sub-light-shielding portion is disposed on a side of the first sub-light-shielding portion away from the panel body and is aligned with the first sub-light-shielding portion.

12. The display panel according to claim 1, wherein the first light source comprises organic light-emitting diodes, mini light-emitting diodes, or micro light-emitting diodes.

13. The display panel according to claim 1, wherein the light sensor comprises a camera or a fingerprint sensor.

14. An electronic device, comprising a display panel, wherein the display panel comprises:
a panel body having a first display region, a second display region, and a non-display region, wherein the first display region is positioned at a edge of the second display region and is connected to the non-display region, the panel body comprises a color filter layer, the color filter layer comprises a black matrix and a plurality of color resists, the black matrix is provided with a plurality of holes, each of second ones of the holes in the second display region is filled with one of the color resists, and each of first ones of the holes in the first display region is empty;
a light control layer and a first light source, wherein the light control layer comprises an optical layer corresponding to the first display region, the optical layer has one of a matte state and a transparent state, and the first light source is disposed on a side of the light control layer away from the second display region; and
a light sensor disposed under the optical layer, wherein at least part of the light sensor is opposite to one of the first ones of the holes.

15. The electronic device according to claim 14, wherein the light control layer further comprises a first electrode and a second electrode, and the optical layer is disposed between the first electrode and the second electrode.

16. The electronic device according to claim 15, wherein the optical layer comprises polymer network liquid crystals or polymer dispersed liquid crystals.

17. The electronic device according to claim 14, wherein the display panel further comprises a backlight module disposed under the panel body, the backlight module comprises a first backlight portion corresponding to the first display region, and the first backlight portion comprises the light control layer and the first light source.

18. The electronic device according to claim 17, wherein the panel body further comprises a plurality of first subpixels and a plurality of second subpixels, the first subpixels are positioned in the first display region, the second subpixels are positioned in the second display region, and the first subpixels comprise a first liquid crystal layer.

19. The electronic device according to claim 18, wherein the first light source comprises first sub-light sources, second sub-light sources, and third sub-light sources, and light colors of the first sub-light sources, the second sub-light sources, and the third sub-light sources are different; and
an arrangement of the first sub-light sources, the second sub-light sources, and the third sub-light sources in a first direction is same as an arrangement of the second subpixels away from the first display region in the first direction, and the first direction is parallel to an extending direction of the side of the light control layer away from the second display region.

20. The electronic device according to claim 19, wherein the first subpixels and the second subpixels further comprise a first substrate and a second substrate, the second substrate is disposed on the first substrate, the second subpixels comprise a second liquid crystal layer, the first liquid crystal layer and the second liquid crystal layer are disposed between the first substrate and the second substrate, the second liquid crystal layer is positioned in the second display region, and the second substrate comprises the color filter layer.

* * * * *